United States Patent [19]

Mieling

[11] Patent Number: 5,471,754
[45] Date of Patent: Dec. 5, 1995

[54] KIT AND METHOD OF USING KIT TO ALIGN WHEELS OF VEHICLE

[76] Inventor: James A. Mieling, 1030 Viking Ct., Batavia, Ill. 60510

[21] Appl. No.: 324,787

[22] Filed: Oct. 18, 1994

[51] Int. Cl.⁶ .................................................. G01B 5/255
[52] U.S. Cl. ...................... 33/203.18; 33/203.19; 33/600
[58] Field of Search .................. 33/203.18, 203, 33/203.12, 203.13, 203.14, 203.15, 203.16, 203.17, 203.19, 203.2, 203.21, 600

[56] References Cited

U.S. PATENT DOCUMENTS

| | | | |
|---|---|---|---|
| 3,488,857 | 1/1970 | Bateman | 33/203.12 |
| 4,114,279 | 9/1978 | Johnson et al. | 33/203 |
| 4,782,596 | 11/1988 | Mieling | 33/203.18 |
| 5,033,198 | 7/1991 | Hastings | 33/203.18 |

*Primary Examiner*—Christopher W. Fulton
*Attorney, Agent, or Firm*—Bernard L. Kleinke; Jerry R. Potts; Peter P. Scott

[57] ABSTRACT

The wheel alignment kit and method related to a wheelless alignment technique employing a pair of alignment fixtures which cooperate with a corresponding pair of turntables to support the vehicle in place of its wheels and to facilitate easy access to the strut assemblies of the vehicle for alignment purposes. The kit also includes an electronic camber gauge tool adopted to be mounted on the fixtures to provide a user with an instantaneous camber reading. A pair of toe gauge tools adapted to be mounted on the fixtures cooperate with a datum line to provide the user with an instantaneous toe reading.

12 Claims, 4 Drawing Sheets

KIT AND METHOD OF USING KIT TO ALIGN WHEELS OF VEHICLE

TECHNICAL FIELD

The present invention relates in general to a kit and method of using the kit to align the wheels of a motor vehicle, and it more particularly relates to a kit and method for using the kit to perform camber and toe adjustments for wheel alignment purposes.

BACKGROUND ART

There have been many types and kinds of wheel alignment devices and techniques. For example, reference may be made to the following U.S. Pat. Nos. 2,281,769; 3,488,857; 4,453,315; 4,651,431 and 4,782,596, each patent mentioned being incorporated herein by reference as though fully set forth.

The device disclosed in U.S. Pat. No. 4,651,431 provided an improved method of wheel alignment by replacing a wheel to be aligned with a wheel alignment device. In this regard, the device is adapted to be mounted to a vehicle wheel strut assembly and supported from below on a camber adjustment rack.

While the above mentioned device and method provides an improvement over the more commonly used wheel in place alignment technique, it would be desirable to have a new and improved device and method that does not require the use of a large bulky and relatively expensive camber rack. In this regard, it would be highly desirable to have a new and improved alignment device and method that enables the camber to be adjusted in the wheel well of the vehicle while the vehicle is supported from below by the remaining wheels of the vehicle.

The device disclosed in the 4,782,596 is attachable to a wheel strut assembly of a motor vehicle in place of the vehicle wheel to help support the vehicle during a wheel alignment operation. The alignment device supports either a camber adjustment gauge, or a toe adjustment gauge. For this purpose, a small forwardly projecting hub disposed within the well of a larger hub of the device includes a front wall for supporting the camber gauge. This arrangement enabled the gauge zeroing operation to be eliminated.

While such an alignment device has been successful in its manner of operation, it would be desirable to have an improved version of the device, which would enable it to assist in the wheel alignment operation in the camber adjustment operation, so that it can be performed in an even more accurate and faster manner. In this regard, at least for some devices, the front wall is not true relative to the strut assembly. Therefore, it would be highly desirable to have a new and improved alignment device that can be referenced in an absolute manner relative to the strut assembly of the vehicle.

Also while the above mentioned camber alignment device and method were successful, the irregular shape of worn hubs, did not always allow the plurality of magnets mounted in the base of the camber gauge to be firmly attached to the hub face in the most desirable manner.

Therefore, it would be highly desirable to have an improved wheel alignment device, which eliminates the need for using magnets to attach the camber adjustment gauge and which can be attached firmly to the wheel alignment device.

DISCLOSURE OF THE INVENTION

Therefore, it is the principal object of the present invention to provide a new and improved wheel alignment kit and method of using the kit for adjusting the camber and toe to manufacturer settings in a fast and reliable manner. Such a kit should be relatively inexpensive to manufacture, have gauges which can be mounted, without the need of magnetic attachments, in a precise absolute manner relative to the wheel strut assembly of the vehicle, and which can be utilized in a fast, convenient manner without the necessity of utilizing large bulky and expensive camber racks.

Briefly, the above and further objects of the present invention are realized by providing a wheel alignment kit which permits both a camber adjustment and a toe adjustment to be accurately and precisely made in a very fast and convenient manner.

The kit and method of using it relates to a wheelless alignment technique where the wheel pair to be aligned are replaced by a pair of alignment fixtures which cooperate with a corresponding pair of turntables to help support the vehicle for alignment purposes. The alignment fixtures are mounted removably to the axle hubs of the wheel strut assemblies of the vehicle and provide relatively easy access to the wheel strut assemblies for alignment purposes. The kit includes an electronic camber gauge tool adapted to be mounted on either of the fixtures to provide a user with an instantaneous camber reading in the wheel well of the vehicle while suspended by the other wheels of the vehicle. For toe alignment, the turntables support the vehicle movably to help emulate tire to ground engagement and facilitate alignment of the vehicle wheels in a highly expeditious and accurate manner. A pair of toe gauge tools are adapted to be mounted interchangeably on either of the fixtures and cooperate with a datum line to provide the user with an instantaneous toe reading.

In this manner, both camber and toe adjustments can be performed quickly and accurately, since the tools are mounted securely on the fixtures permitting the user to obtain instantaneous readings while performing adjustments. Thus, there is no need for trial and error procedures and adjustments are very accurate.

According to another form of the present invention, the kit includes a front to rear wheel alignment device for four wheel alignment. The wheel alignment device includes an axle to axle reference tool and thrust line to enable the user to obtain an instantaneous reading of the front wheel to rear wheel reference.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
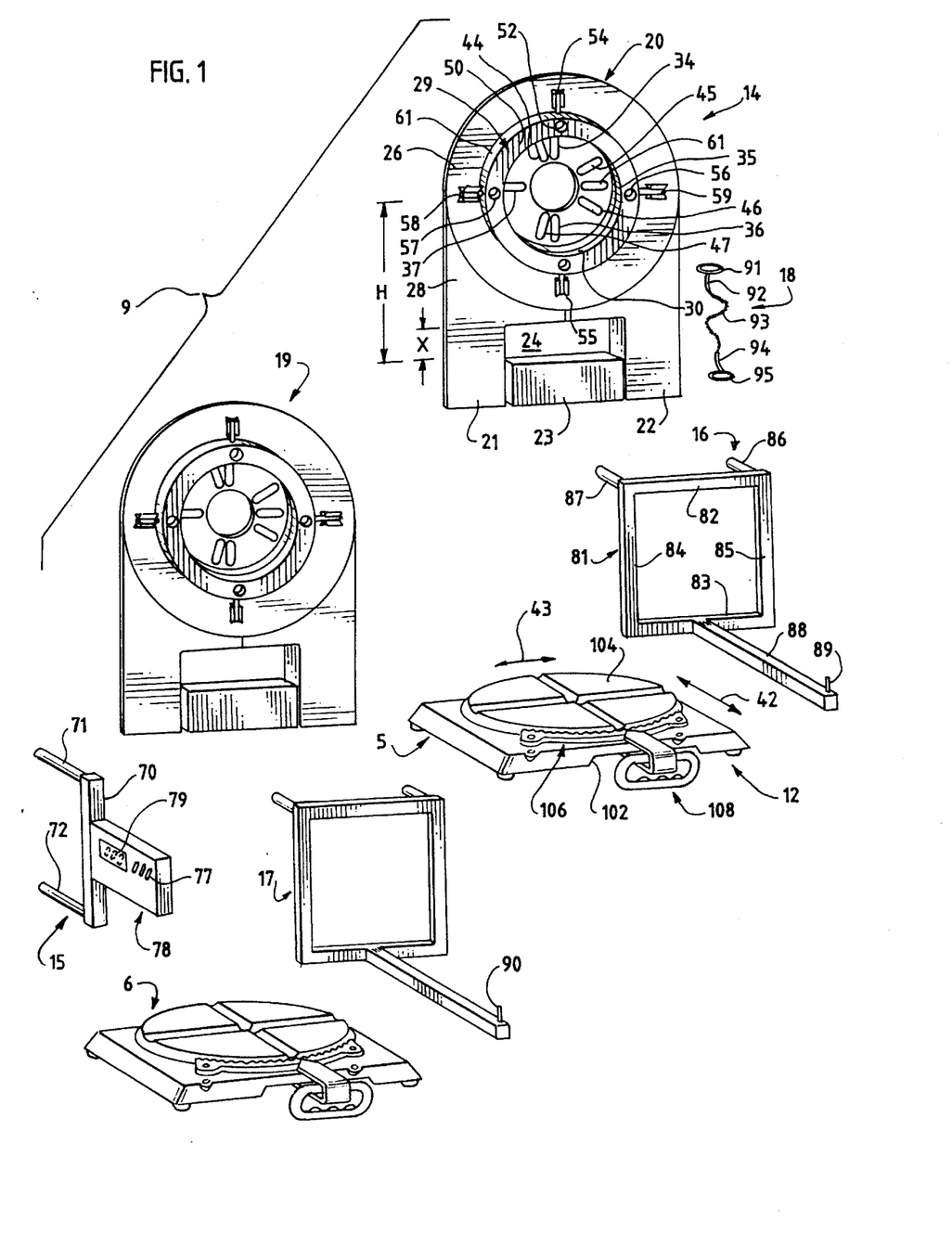
FIG. 1 is a pictorial view illustrating operative elements of a wheel alignment kit, which is constructed in accordance with the present invention.

Referring now to the drawings, and more particularly to FIG. 1 thereof, there is shown a wheel alignment kit 9, which is constructed in accordance with the present invention. The kit 9 is used according to the method of the present invention to facilitate camber, and wheel to wheel toe adjustments for a motor vehicle 8 in a fast and convenient manner.

Figure 5:
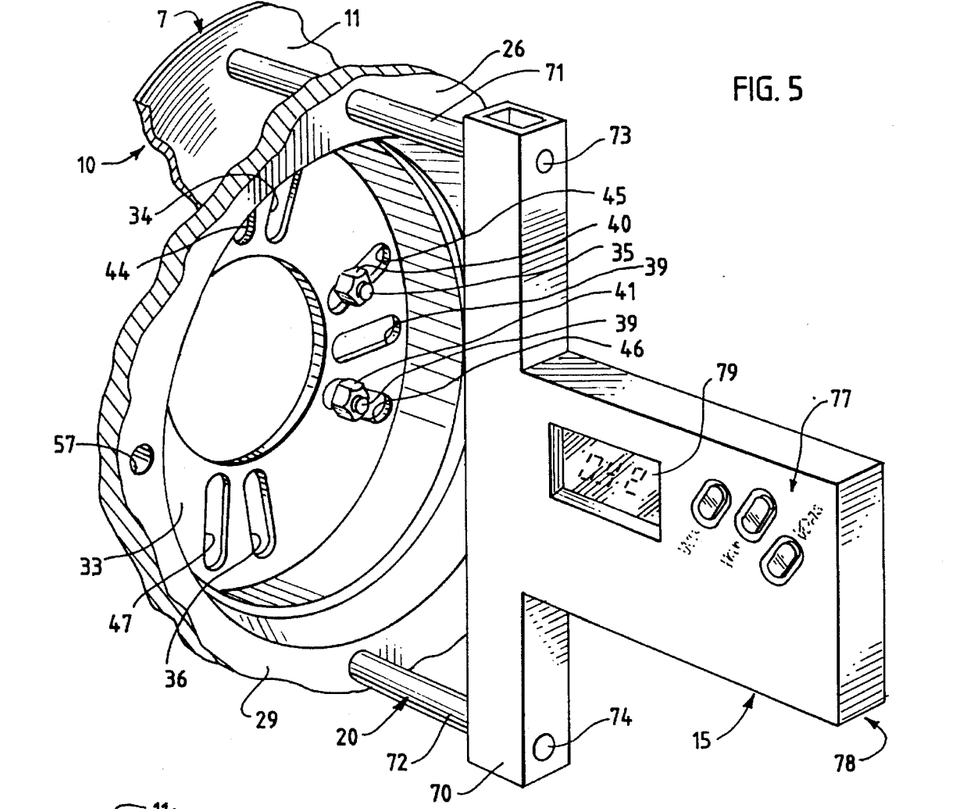
FIG. 5 is a fragmentary cut away pictorial view, illustrating a positioned alignment fixture with an associated camber gauge mounted thereon in an intermediate step of the process of determining instantaneous camber.

The wheel alignment kit 9 generally comprises a pair of alignment devices 5 and 6 (FIG. 1) for supporting the vehicle 8 in place of its wheels (not shown) to facilitate wheel alignment. An electronic camber gauge tool 15 and a pair of toe gauge tools 16 and 17 having a datum line 18 for mounting removably therebetween are adapted to be mounted removably to the devices 5 and 6 to facilitate instantaneous camber and toe readings during the wheel alignment procedure. In this regard, the camber gauge tool 15 measures the angle of inclination of each of the devices 5 and 6 from the vertical referenced to their associated brake rotors, such as a rotor 7.

The kit 9 is utilized in initially determining camber, adjusting camber to manufacturer specification for each wheel, and then adjusting the wheel to wheel toe to manufacturer specifications in a fast and convenient manner. The kit 9 is self contained and does not require the necessity of any other special equipment such as mirrors, lifts, computers or the like. The method of performing camber and toe alignment for the vehicle 8 with the kit 9 will hereinafter be described in greater detail.

Figures 2, 3, 4:
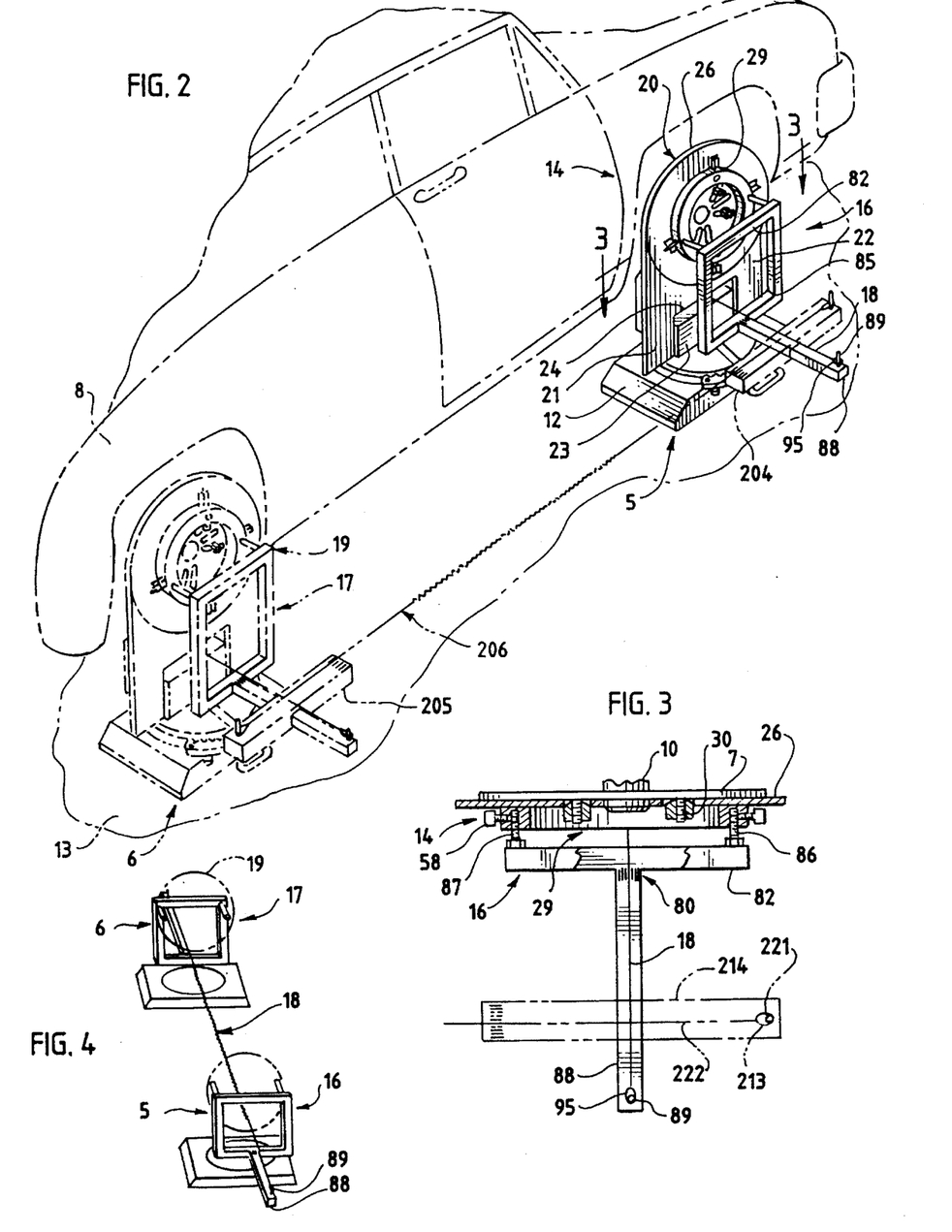
FIG. 2 is a pictorial view illustrating positioned alignment fixtures with toe gauge tools mounted thereto as a final step of the alignment method for wheel alignment.
FIG. 3 is a partially cut away sectional view of the alignment device and toe gauge tool of FIG. 2 taken substantially along line 3—3 illustrating the brake rotor and hub axle of the vehicle.
FIG. 4 is a diagrammatic view of alignment device and toe gauge tools arranged for determining wheel to wheel toe readings.

Considering now the alignment devices 5 and 6 in greater detail with reference to FIGS. 1–6, the devices 5 and 6 are illustrated diagrammatically in FIG. 4 mounted on the wheel strut assemblies of the motor vehicle with the stud and wheel nuts in place of the wheels of the vehicle. Each wheel strut assembly includes an axle hub, such as the axle hub 10 (FIG. 5). As each of the devices 5 and 6 are substantially identical, only device 5 will be described in greater detail.

Referring now to FIG. 1, the device 5 generally includes an alignment fixture 14 and a support base or floating platform 12 for supporting the vehicle 8 movably from below. The alignment fixture 14 is adapted to be mounted removably on the wheel strut assembly of the motor vehicle and to rest on the platform 12. The alignment fixture 14 is relatively small compared to the replaced wheel and thus, a repair person (not shown) can gain access to the strut assembly easily for adjustment purposes.

As best seen in FIGS. 1 and 5, the alignment fixture 14 generally includes an upright rigid mount member 20 having a pair of spaced apart downwardly depending legs or vertical support members 21, 22 attached thereto. The vertical members 21, 22 are composed of a rigid material, such as steel, of sufficient strength to support the weight of the vehicle when the fixture 14 is attached to the axle hub 10 of the motor vehicle. A generally rectangular or square shaped elongated block member 23 is mounted for pivotal movement between the vertical members 21, 22 by a pivot pin (not shown).

The block 23 is disposed in an off centered position between the vertical members 21, 22 so that it can be pivoted about the pivot pin to rest on a selected one of its side surfaces. In this regard, one of four different vertical positions can be selected, each one corresponding to one of the four sides to adjust the height of the fixture 14 to accommodate different ground or surface levels. This arrangement enables the device 5 to support the vehicle 8 in a substantially level manner on the platform 12 which rests on a support surface 13 (such as the floor of a garage). Suitable means such as roller bearing (not shown) enable floating platform movement on the support surface during the alignment operation. In this regard, both rectilinear movement in the direction indicated by an arrow 42 (FIG. 1) and rotational movement in the direction indicated by an arrow 43 (FIG. 1) are made possible. This combined movement with the pivoting of the block member 23 to its various face surfaces help facilitate the alignment operation by emulating tire to road engagement when the weight of the vehicle is supported by fixtures and floating platforms.

As best seen in FIGS. 1 and 5, the rigid member 20 include a circular rigid member 26 which has a pair of depending triangular flanges 27 and 28 which are integrally connected to the vertical members 21, 22 and a large external centrally disposed collar or hub 29 projecting outwardly therefrom to define a centrally disposed well 30.

The circular member 26 has a given diameter that is substantially smaller than the diameter of conventional automobile tires. In this regard, when the fixture 14 is mounted to the axle hub 10 in place of the vehicle wheel a user will have easy access to the vehicle adjustment fixtures (not shown) for adjusting camber and toe settings.

As best seen in FIG. 1, the distance between the geometric center of the circular member 26 and the top surface of the block is about H. A space 24 is disposed between the top surface of the block and the base of the circular member 26. Space 24 has a height of about X and provides an access area to a user that facilitates toe alignment as will be explained hereinafter in greater detail.

The collar 29 is dimensioned to correspond substantially to the circumference of a conventional brake rotor, such as the brake rotor 7 (FIG. 5) disposed on the axle hub 10. In this regard, the brake rotor 7 is precision machined and includes a face surface 11 (FIG. 5) that is substantially true to the axle of the vehicle 8. Thus, the face surface 11 provides an excellent base measuring surface for determining camber as will be explained in greater detail.

The collar 29 includes a top wall portion 50 having a pair of spaced apart brake rotor access holes 52 and 53 disposed therein. The access holes 52, 53 are disposed diametrically opposite from one another at the top and bottom of the collar 29 and extend completely through the fixture 14 thus providing access to the brake rotor 7 through the fixture 14 when the fixture 14 is mounted in front of the brake rotor 7 on the axle hub 10.

A set of spaced apart toe gauge receiving apertures 56 and 57 are disposed diametrically opposite from one another in the collar 29 midway between the access holes 52 and 53. As will be explained herein in greater detail the apertures 56 and 57 help position and receive the toe gauge tool 16 to facilitate toe alignment.

The collar 29 also includes an outside wall 60 and an inside wall 61. A set of equally spaced apart lock receiving holes (not shown) are disposed in the outside wall surface 60 and extend a sufficient depth inward from the outside wall 60 toward the inside wall 61 to intersect access holes 52, 53 and toe holes 56, 57 respectively. A set of lock nuts, such as the lock nuts 54, 55 and 58, 59 are received within the lock receiving holes for helping to secure removably the tools 15 and 16 in holes 52, 53 and 57, 58 respectively.

Figure 6:
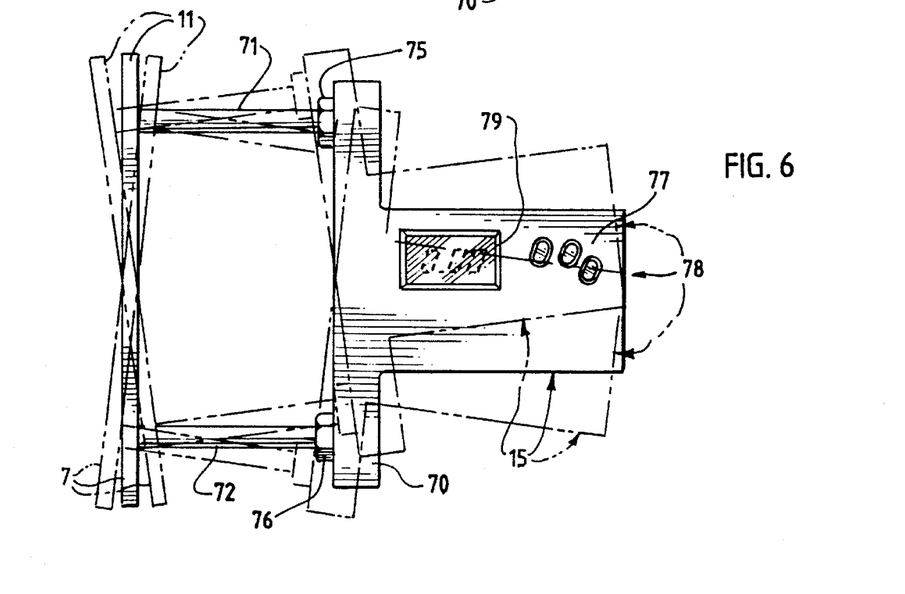
FIG. 6 is a diagrammatic view illustrating the positions of the camber gauge tool relative to a vehicle brake rotor in an intermediate step of the process of adjusting camber.

Considering now the camber gauge tool 15 in greater detail with reference to FIGS. 1 and 5, the tool 15 generally includes an elongated generally rectangularly shaped support bar 70 having a pair of spaced apart sensing rods 71, 72 extending perpendicularly therefrom at its opposite ends. The rods 71, 72 are received in a pair of threaded holes 73 and 74 (FIG. 5) respectively and are secured removably in place by a pair of lock nuts 75, 76 (FIG. 6). An electronic readout device 78 is mounted (by means not shown) on an opposite side of the bar 70 from the sensing rods 71 and 72 and extends perpendicularly therefrom in a direction diametrically opposite to the rods 71, 72. The electronic device 78 includes a set of control buttons indicated generally at 77 and a digital meter 79 coupled to the rods 71, 72 for sensing when the tool engages the fixture 14, and whether the distal ends of the rods 71, 72 are in substantially equal engagement with the brake rotor face, such as the brake rotor face 11.

Considering now the toe gauge tool 16 now in greater detail with reference to FIGS. 1 and 2, the toe gauge tool 16 generally includes a rectangular or square shaped frame indicated generally at 81 having an upper member 82, a lower member 83, and a pair of side members 84, 85. A pair of elongated spaced apart rods 86 and 87 extend perpendicularly from the upper member 82 and are dimensioned for being received in the apertures 56 and 57 respectively to support the tool 16 on the fixture 14.

An elongated toe alignment bar 88 having a removable datum line engagement or tether pin 89 disposed at its distal end and toe alignment indicia indicated generally 80 at its proximate end extends perpendicularly from the lower member 83 in a diametric opposite direction of the rods 86 and 87. The length of the toe bar 88 is about equal to the diameter of the brake rotor 7 and has a length dimension calibrated geometrically relative to the indicia 80. In this regard, the indicia 80 is subdivided into a plurality of indicia marks separated from one another by about one thirty-second of an inch so the amount of toe change at the wheel, whether toe in or toe out, is precisely measured by the datum line 18 position relative to the indicia 80. The center of the indicia 80 is zero toe, the right end of the indicia 80 is toe out and the left end of the indicia 80 is toe in. As the diameter of the brake rotors may vary, the length of the bar 88 is between about to ten inches and about fourteen inches. A more preferred length is between about eleven inches and about thirteen inches, and the most preferred length is about twelve inches.

From the foregoing it will be understood by those skilled in the art that the spaces between indicia 80 and the position of the tether pin 89 on the toe gauge bar 88 are precisely calibrated relative to the length of the datum line for measuring maximum toe both positively and negatively. In this regard, if the tether pin 89 is disposed too close to the indicia 80, the movement of the datum line 18 relative to the indicia 80 will be too short to permit accurate toe readings. Similarly, if the pin 89 is disposed too far from the indicia 80, the movement of the datum line 18 relative to the indicia 80 will be too great to permit accurate toe readings.

The height of the frame 81 is about H-X to permit the datum line 18 to pass through the space 24 so it can be attached at one of its ends to pin 89 and at its opposite end to another toe gauge tool mounted on an oppositely disposed fixture, such as the toe gauge tool 17 and an alignment fixture 19 (FIGS. 1 and 4). This arrangement permits the datum line 18 to be attached between fixtures 14 and 19 and to overlay the toe gauge indicia 80 to provide an instantaneous toe reading to the user. To permit proportional alignment settings relative to amount of wheel toe, the longitudinal length of the toe gauge bar 88 is equal to about R inches, where R is about 12 inches. Thus, the length of bar 88 is chosen so that the rate of toe change at the wheel is precisely calibrated.

The inventive kit 9 enables quick and easy camber adjustment on the various strut assemblies. In this regard, in use, the person performing the alignment procedure raises the front of the vehicle 8 off the ground 13 using a conventional jack or lift (not shown) and removes the front wheels of the vehicle.

Once the wheels are removed, the alignment fixtures 14 and 19 are mounted to the stud bolts on the respective axle hub, such as bolts 38 and 39 on axle hub 10 (FIG. 5). For example, the fixture 14 is secured on bolts 38 and 39 by the lug nuts 40, 41 respectively.

The user then inserts the camber gauge tool 15 into the rotor access holes 52 and 53 a sufficient distance to cause the rods 71 and 72 to engage the face 11 of the brake rotor 7. The tool 15 is then secured removably in place by the user engaging lock nuts 54 and 55 into rods 71 and 72 respectively. The user then activates the tool 15 and verifies the instantaneous camber reading on the digital meter 79.

Assuming the manufacturer of the vehicle 8 has specified a specific camber setting other than that initially determined by the tool 15, the user lowers the vehicle 8 onto the support base 12. Next, the user grasps the fixture 14 and rocks the fixture 14 on base 12 to assure the weight of the vehicle is freely floating on the support base 12.

The user then reaches over the fixture 14 to reach the wheel strut assembly and its associated camber adjustment bolts (not shown). The bolts are then loosened to permit the user to slide the strut assembly 7. In this regard, as the user slides the strut assembly 7, the tool 15 will engage the face 11 of the rotor 7, as best seen in FIG. 6, in various positions. As the strut assemblies position is adjusted, the user can instantaneously read camber on the meter 79 until the digital readout is adjusted to the desired camber, for example, a zero camber.

Once the desired camber is achieved, the user locks the strut assembly into position. Thus, there is no need for a trial and error adjustment operation, and the resulting alignment is accomplished in a straight forward and accurate manner in about 30 seconds.

The user then repeats this procedure for the opposite front wheel.

From the foregoing, one skilled in the art will understand the camber for both front wheels can be completed in about one minute.

Similarly, the inventive kit 9 is convenient for toe adjustment. In this regard, after the camber adjustments have been completed, the camber gauge tool 15 is removed from the fixture 19, and the toe gauge tools 16 and 17 are mounted on fixtures 14 and 19 respectively illustrated in FIGS. 2 and 4.

Once each of the toe gauge tools 16 and 17 have been mounted in the associated fixtures 14 and 19, the user attaches the datum line 18 between toe gauge tools 16 and 17 respectively. For example, the user attaches one end of a datum line 18 to the datum line pin 89 on tool 16, pass the line through the space 24 in the fixture 14 and takes the opposite end of the datum line 18 to opposite side of the vehicle and attaches the line 18 to another datum line pin 90 on tool 17.

Once the datum line 18 has been affixed removably between the tools 16 and 17, the user commences the adjustment on one wheel by loosening the toe tie rod for the strut assemblies, such as a left front toe tie rod (not shown) and adjusts it until the datum line 18 aligns with a desired one of the toe indicia on the toe indicia gauge of tool 16. When the desired setting has been achieved, the user tightens the tie rod. This procedure is then repeated on the opposite right front and adjusted toe following the same procedure.

To assure the front and rear portions of the vehicle are at the same level relative to the ground 13, the person performing the alignment procedure spaces the device apart from one another as shown in FIG. 2, mounts the toe tools 16 and 17 in the respective fixture 14 and 19 and then extends a straight elongated beam (not shown) between the tools 16 and 17. The electronic camber tool 15 is then placed on the top surface of the beam in an upright position to determine whether the beam is level relative to the ground 13. If the beam is not level, one of the block members, such as the block member 23 can be rotated pivotally to raise of lower the beam to a leveled position.

Considering now the datum line 17 in greater detail with reference to FIG. 1, the datum line 17 includes at one of its ends a mounting ring or loop 91 having a short thin wire 92 attached thereto. The other end of the wire 92 is attached to an elastic cord 93 having its opposite end attached to another thin wire 94. The other end of wire 94 is attached to a mounting loop 95 that is substantially similar to loop 91.

The elastic cord 93 enables the line 18 to be easily stretched across the width of a vehicle along its axle for mounting the line 18 between tools mounted on the opposite ends of a given axle, such as the tools 16 and 17.

The wires 92 and 94 each have a sufficient length to extend the entire longitudinal length of a toe gauge bar, such as the length of the toe gauge bar 88.

Considering now the circular member 26 in greater detail, the base of the well 30 defines a generally circular mounting surface 33 (FIG. 5) having a set of equally spaced apart radially extending slots 34–37 dimensioned for receiving therein a plurality of mounting studs or bolts, such as bolts 38 and 39 (FIG. 5) extending outwardly from the axle hub 10. Another set of radially extending slots 44–47 are also disposed in the mounting surface 33 that, in cooperation with slots 34–37, permit the fixture 14 to be mounted universally to axle hubs having various mounting stud or bolt configurations.

Considering now the base support 12 in greater detail with reference to FIG. 1, the base support contains a stationary support plate 102 for resting on the ground 13 and a movable support plate 104 mounted on top of plate 102 for rectilinear and rotational movement.. The outside periphery of the support plate 104 includes a plurality of notches or grooves indicated generally at 106. A latch 108 mounted to plate 102 includes an engaging member 109 that is dimensioned for being received in an individual one of the plurality of notches 106. In this regard, when the end of the engaging member 109 is received in a notch, the latch 108 locks the plate 104 in a fixed position.

Figure 7:
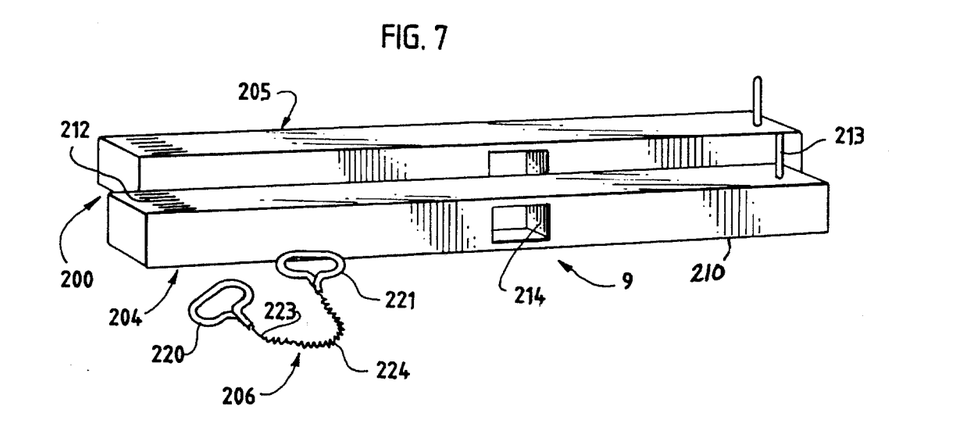
FIG. 7 is an enlarged fragmentary pictorial view of an alignment kit, which is constructed in accordance with the present invention.

Referring now to FIG. 7, there is shown another wheel alignment kit 200, which is constructed in accordance with the present invention. The kit 200 is used according to the method of the present invention to facilitate camber, wheel to wheel toe adjustment and front to rear wheel alignment for vehicles having four adjustable wheels, such as the vehicle 8.

The kit 200 generally includes the kit 9 (shown in FIG. 1, but omitted from FIG. 7), a pair of axle to axle alignment tools 204 and 205, and a thrust line 206 adapted to be mounted removably therebetween.

Considering now the axle to axle alignment tools 204 and 205 in greater detail, the tools 204 and 205 are substantially identical so only tool 204 will be described in greater detail.

Referring now to FIG. 7, the tool 204 generally includes a generally elongated rectangularly shaped axle to axle gauge bar 209 having axle to axle indicia 212 at one end, a thrust line tether pin 213 at an opposite end, and a centrally disposed hole 214 extending across its entire width. The hole 214 is dimensioned to slidingly receive therein a toe alignment bar, such as the toe alignment bar 88 so that they are disposed in perpendicular alignment with one another as best seen in FIG. 2. The axle bar 209 is mounted on the bar 88 by a lock nut (not shown).

Considering now the thrust line 206 in greater detail, the thrust line 206 is substantially similar to the datum line 18 having a pair of loops 210 and 221, a pair of gauge wires 222 and 223 attached to respective loops 210 and 221 and an elastic cord 224.

Considering now the four wheel alignment once the front axle camber and tow adjustments have been completed, the devices 5 and 6 (FIG. 1) are moved from their respective front wheel locations to the corresponding rear wheel locations. The camber and toe adjustments are then repeated from the right and left rear wheels.

After the camber and toe adjustments for the rear wheels have been completed, the device 5 is moved back to the front right wheel location while the device 6 is moved to the right rear wheel location. Axle to axle tools 204 and 205 are then mounted on the respective toe gauge. In this regard, the tether pins on the toe alignment bars are removed, such as the tether pin 89 on alignment bar 88, to enable the tools 204 and 205 to be mounted onto their respective alignment bars.

Considering now the axle to axle alignment procedure, once the front axle camber and toe adjustments have been completed, the device 6 is moved from the left front wheel location to the right rear wheel location as best seen in FIG. 2.

The axle to axle tools 204 and 205 are then mounted on the respective toe gauge bars of each respective tool, such as the toe gauge bar 88 on tool 16. The thrust line 206 is then extended between the tools 204 and 205 and attached removably to their respective tether pins, such as the pin 213.

Once the thrust line 206 is attached, an immediate reading is available to reference the front wheel to the back wheel. In this regard, the person performing the adjustment uses a wheel clamp (not shown) to lock the rear wheel in place as a reference and then verifies whether the front wheel runs with the rear wheel. The front wheel adjustment is then made to run the right front wheel with the right rear wheel. In this regard, the wheels on the same side of the vehicle are aligned so they are disposed in the same plane or in a parallel plane.

Once the right front to rear alignment has been completed, the devices 5 and 6 are moved to the corresponding left front and rear wheel locations. The procedure is then repeated on the opposite side of the vehicle.

Figure 8:
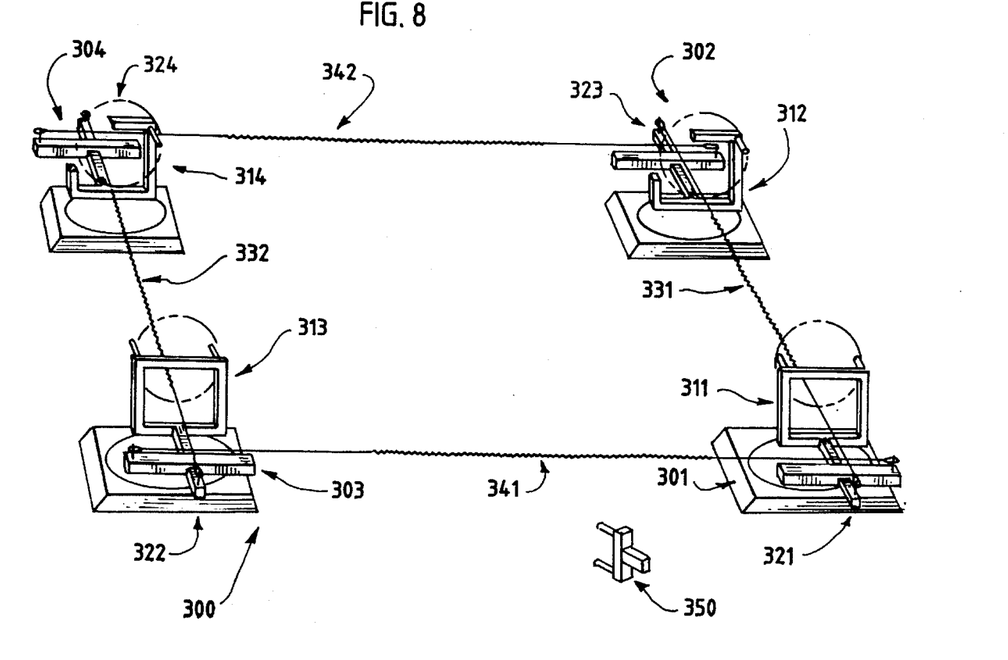
FIG. 8 is a diagrammatic view of an alignment kit which is constructed in accordance with the present invention.

Referring now to FIG. 8, there is shown another wheel alignment kit 300 which is constructed in accordance with the present invention. The kit 300 is used according to the method of the present invention to facilitate camber, wheel to wheel toe adjustments and front to rear wheel alignments for vehicle having four adjustable wheels.

The kit 300 generally includes a set of alignment devices 301–304 where each device is substantially identical to the device 5 of FIG. 1, a set of toe gauge tools 311–314 where each toe tool is substantially identical to toe tool 16, a set of axle to axle alignment tools 321–324 where each alignment tool is substantially identical to alignment tool 204, a pair of datum lines 331 and 332 where each datum line is substantially identical to the datum line 18 (FIG. 1), a pair of thrust lines 341 and 342 where each thrust line is substantially identical to the thrust line 206 (FIG. 2), and a camber gauge tool 350 that is substantially identical to the tool 15.

The kit 300 is used according to the method of using kit 9 and kit 200 except that respective devices 301–304 are mounted to the four respective axle hubs of a vehicle (not shown). In this manner, the devices 301–304 do not require rotation from front to rear to accomplish alignment. Thus, four-wheel alignment can be accomplished in a more expeditious manner with the kit 300.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A wheel alignment kit, comprising:

alignment fixture means having universal mounting means to permit said fixture means to be mounted removably to a strut assembly of a motor vehicle in place of its wheels for helping to support the weight of said vehicle to facilitate wheel alignment;

said alignment fixture means including alignment tool receiving means to enable a user to have access to a reference surface relative to said strut assembly for facilitating wheel alignment;

support means dimensioned to support from below movably said alignment fixture means for helping to emulate tire to ground engagement for wheel alignment purposes;

reference tool means secured removably within said alignment tool receiving means for engaging said reference surface to provide the user with an instantaneous visual indication of the position of said strut assembly to facilitate alignment adjustments to a manufacturer specification; and engagement means mounted to said alignment fixture means for securing removably said tool means in said alignment fixture means to hold said tool means in a fixed positional engagement with said reference surface.

2. A wheel alignment kit according to claim 1, wherein said support means includes:

base means adapted for rectilinear and rotational movement relative to the ground to help facilitate a wheel alignment operation; and pivotal base means attached pivotally to a bottom portion of said alignment fixture means and adapted to rest engagingly on said base means to enable the weight of the vehicle to float rockably rectilinearly rotationally relative to the ground.

3. A wheel alignment kit according to claim 1, wherein said reference tool means is electronic reference tool means for providing an alignment readout electronically.

4. A wheel alignment kit according to claim 3, wherein said electronics reference tool means includes electronic read out means for indicating camber.

5. A wheel alignment kit according to claim 1, wherein said reference tool means is toe gauge tool means for helping to facilitate wheel toe alignment.

6. A wheel alignment kit according to claim 5, wherein said toe gauge tool means includes:

a pair of toe gauge tools; and wherein said alignment fixture means includes a pair of alignment fixtures;

said pair of alignment fixtures being adapted to be mounted on opposing strut assemblies of the vehicle; and wherein individual ones of said pair of toe gauge tools are adapted to be mounted removably to corresponding individual ones of said pair of alignment fixtures.

7. A wheel alignment kit according to claim 6, wherein each individual one of said pair of tool gauge tools includes:

a pair of spaced apart alignment rods adapted to be supported in said tool receiving means;

a support bar for helping to support said alignment rods in a desired position for wheel alignment purposes;

alignment rod receiving means for receiving and supporting said alignment rods in perpendicular alignment with said support bar;

a wheel toe gauge bar having wheel toe gauge indicia disposed thereon for helping a user to determine toe instantaneously;

datum line means for cooperating with the wheel toe gauge indicia to facilitate wheel toe alignment;

a datum line tether pin mounted at a distal end of said wheel toe gauge bar for receiving thereon a terminal end of said datum line means; and said datum line means being mounted removably between said pair of toe gauge tools and extending along an imaginary line that is substantially parallel with an axle of the vehicle.

8. A wheel alignment kit according to claim 7, further comprising:

an axle toe gauge bar mounted movably perpendicular to said wheel toe gauge bar means;

said axle toe gauge bar having axle toe gauge indicia disposed thereon for helping a user to determine toe instantaneously;

thrust line means for cooperating with the axle toe gauge indicia to facilitate wheel toe alignment; and a thrust line tether pin mounted at a distal end of said axle to axle toe gauge bar for receiving thereon a terminal end of said thrust line means.

9. A wheel alignment kit according to claim 1, wherein said support means includes:

a base plate for helping to support from below the weight of a vehicle;

wherein said alignment fixture means is camber fixture means adapted to rest on said base plate and mounted to said support means for engaging said strut assembly of said vehicle to facilitate wheel alignment;

wherein said alignment tool receiving means is defined by a pair of brake rotor access holes for providing access to a brake rotor of said vehicle to further facilitate wheel alignment; and wherein said reference tool means is camber gauge tool means having a pair of spaced apart alignment rods adapted to be supported within said pair of brake rotor access holes for engaging said brake rotor to sense camber;

said camber gauge tool means including electronic readout means coupled to said spaced apart alignment rods for providing an instantaneous visual indication of camber when said alignment rods engage said brake rotor;

said camber fixture means being further mounted to said axle hub for cooperating with said support means to help support the weight of said vehicle on the ground in place of wheels to facilitate wheel alignment;

whereby camber can be visualized by a user as said user makes a wheel alignment adjustment to a desired camber setting.

10. A wheel alignment kit, comprising:

a plurality of alignment fixture means each including universal mounting means to permit individual ones of said fixture means to be mounted removably to a vehicle in place of its wheels for helping to support the weight of said vehicle to facilitate wheel alignment;

a plurality of support means for helping to emulate tire to ground engagement for wheel alignment purposes, individual ones of said plurality of support means being dimensioned to support from below individual ones of said plurality of alignment fixture means for movement relative to the ground to facilitate wheel alignment;

each individual one of said plurality of alignment fixture means including brake rotor access means to enable a user to have access to a camber reference surface on said vehicle for helping to determine wheel camber;

electronic reference tool means adapted to be received within said brake rotor access means for engaging said camber reference surface to determine wheel camber;

said electronic reference tool means including readout means for providing a user with an instantaneous visual indication of camber when said tool means engages said surface;

each individual one of said plurality of alignment fixture means including reference tool receiving means to enable a user to have access to a toe reference surface substantially parallel to said camber reference surface;

a plurality of toe gauge tool means, each individual one of said plurality of toe gauge tool means having toe gauge indicia means disposed thereon and being adapted to be mounted removably with an individual one of said reference tool receiving means to engage said toe reference surface to help determine toe; and elastic toe line means mountable removably between pairs of said plurality of toe gauge tool means disposed substantially opposite from one another for cooperating with said toe gauge indicia means to provide the use with an instantaneous visual indication of toe when said toe line means is mounted between the pairs of toe gauge tool means.

11. A method of aligning the wheels of a vehicle, comprising:

mounting alignment fixture means to a strut assembly of the vehicle, said alignment fixture means including alignment tool receiving means to permit access to a reference surface relative to said strut assembly to facilitate wheel alignment by a user;

supporting said alignment fixture means from below movably on support means to emulate tire to ground engagement to further facilitate wheel alignment;

engaging said reference surface with tool means to provide the user with an instantaneous visual indication of the position of said strut assembly to facilitate alignment adjustments to a manufacturer specification; and securing said tool means removably in said alignment fixture means to hold said tool means in fixed engagement with said reference surface;

whereby the user is provided with an instantaneous visual indication of the position of said strut assembly while adjustments are made for wheel alignment purposes.

12. A wheel alignment kit according to claim 1, further comprising:

right toe gauge tool receiving means to help facilitate right front wheel toe alignment;

left toe gauge tool receiving means to help facilitate left front wheel toe alignment;

said right toe means having a right side frame with a pair of spaced apart alignment rods extending perpendicularly therefrom, said rods being adapted to be supported within said alignment fixture means to help facilitate right front wheel toe alignment;

said left toe means having a left side frame with another pair of spaced apart alignment rods extending perpendicularly therefrom, said other rod being adapted to be supported within said alignment fixture means to help facilitate left front wheel toe alignment;

said right toe means including right toe bar means extending in a diametrically opposite direction than said rods, said right toe bar means extending a given distance from said right frame;

said right toe bar means including a right side tether pin disposed at a distal end of said right toe bar means for line anchoring purposes and right toe indicia means indicative of right wheel toe positions disposed at a proximal end of said right toe bar means;

said left toe bar means including a left side tether pin disposed at a distal end of said left toe bar means for line anchoring purposes and left toe indicia means indicative of left wheel toe positions disposed at a proximal end of said left toe bar means; and datum line means adapted to extend between said right side tether pin and said left side tether pin and to pass over said right toe indicia means and said left toe indicia means for providing a visual indication of right wheel toe and left wheel toe respectively.

* * * * *